US00RE36453E

United States Patent [19]

Abondance et al.

[11] E Patent Number: Re. 36,453

[45] Reissued Date of Patent: Dec. 21, 1999

[54] SKI INCLUDING SIDES AND AN UPPER SHELL

[75] Inventors: Roger Abondance, La Murette; Jean Bauvois, Villars de Lans; Jean-Marc Forneri, Saint Sauveur, all of France

[73] Assignee: Skis Rossignol S.A., Voiron, France

[21] Appl. No.: 09/190,179

[22] Filed: Nov. 12, 1998

Related U.S. Patent Documents

Reissue of:

[64] Patent No.: 5,496,053
Issued: Mar. 5, 1996
Appl. No.: 08/215,636
Filed: Mar. 22, 1994

[30] Foreign Application Priority Data

Apr. 16, 1993 [FR] France ..... 93 04727

[51] Int. Cl.[6] ..... A63C 5/12

[52] U.S. Cl. ..... 280/609; 280/610

[58] Field of Search ..... 280/601, 608, 280/609, 610

[56] References Cited

U.S. PATENT DOCUMENTS

| | | |
|---|---|---|
| 2,362,380 | 11/1944 | Kallstrom et al. . |
| 2,369,004 | 2/1945 | Andreef . |
| 3,272,522 | 9/1966 | Kennedy, III . |

(List continued on next page.)

FOREIGN PATENT DOCUMENTS

| | | |
|---|---|---|
| 0 394 835 | 10/1990 | European Pat. Off. . |
| 0 490 044 | 6/1992 | European Pat. Off. . |
| 0 543 743 | 5/1993 | European Pat. Off. . |
| 1 207 145 | 2/1960 | France . |
| 1 459 879 | 11/1966 | France . |
| 2 476 495 | 8/1981 | France . |
| 2 522 976 | 9/1983 | France . |

(List continued on next page.)

OTHER PUBLICATIONS

Photograph A—Cross–sectional views of the Blizzard V–Prestige ski sample (Mar., 1991).

Photograph B—Cross–sectional view of a first Blizzard ski sample (Mar., 1992).

Photograph C—Cross–sectional view of a second Blizzard ski sample (known to Applicants to be available in the United States in Mar., 1992 (alleged in a German/European Patent Office proceeding to be available in the United States in Mar., 1991)).

Photograph D—Cross–sectional view of the Völkl V–19 Vario ski sample (Feb., 1991).

Photograph E—Cross–sectional view of the Völkl "Snow Ranger" (Mar., 1994).

Völkl's 1991/92 ski brochure (Feb., 1991).

Blizzard's "La Technology Prestige Pre–Chassis" brochure (Feb., 1991).

Blizzard's 1994/95 ski brochure (Feb., 1994).

Blizzard's 1991/92 ski brochure (Feb., 1991).

Documentation relating to alleged prior art usage and/or knowledge including a Communication to the German Patent Office (GPO) dated May 3, 1995 (from the opposer), Blizzard's "V–Prestige" Pre–ISPO seminar document (Austria) (dated Feb., 1991), an Affidavit of Franz Schenner dated Feb., 1995, an Affidavit of Franz Scherübl dated Jan., 1995, a communication to the European Patent Office (EPO) dated Oct. 13, 1997 (including an article in "Ski Trading News" dated Feb., 1991) and a Communication from the EPO dated Jul. 13, 1998.

*Primary Examiner*—J. J. Swann
*Assistant Examiner*—Michael Mar
*Attorney, Agent, or Firm*—Oliff & Berridge, PLC

[57] ABSTRACT

[This] *A* ski comprises longitudinal reinforcing elements, each bearing on one edge, and forming the sides of the ski, at least one of them extending over a part of the height of [this] *the* ski, and a shell forming the upper face and a part of at least one of the lateral walls of the ski, and the longitudinal borders of which rest and are fixed on the upper face of the sides, the respective heights of a side and of the shell on at least one of the lateral parts of the ski varying in the same proportions over the length of the ski.

35 Claims, 4 Drawing Sheets

U.S. PATENT DOCUMENTS

| | | |
|---|---|---|
| 3,372,943 | 3/1968 | Grossauer . |
| 3,580,596 | 5/1971 | Völkl . |
| 4,175,767 | 11/1979 | Scheruebl . |
| 4,300,786 | 11/1981 | Alley . |
| 4,671,529 | 6/1987 | LeGrand et al. . |
| 4,681,725 | 7/1987 | Maruyama . |
| 4,858,945 | 8/1989 | Kashiwa . |
| 4,911,462 | 3/1990 | Diard et al. . |
| 5,002,300 | 3/1991 | Pascal et al. . |
| 5,292,148 | 3/1994 | Abondance et al. . |
| 5,366,234 | 11/1994 | Rohrmoser . |
| 5,559,036 | 9/1996 | Abondance et al. . |

FOREIGN PATENT DOCUMENTS

| | | |
|---|---|---|
| 2 611 518 | 9/1988 | France . |
| 2 611 519 | 9/1988 | France . |
| 2 615 404 | 11/1988 | France . |
| 1 478 169 | 8/1969 | Germany . |
| 4 328 840 | 3/1995 | Germany . |
| 86/05994 | 10/1986 | WIPO . |
| 91/08029 | 6/1991 | WIPO . |
| 91/09653 | 7/1991 | WIPO . |

SKI INCLUDING SIDES AND AN UPPER SHELL

Matter enclosed in heavy brackets [ ] appears in the original patent but forms no part of this reissue specification; matter printed in italics indicates the additions made by reissue.

BACKGROUND OF THE INVENTION

The subject of the present invention is a ski, and especially an alpine ski including sides and an upper shell.

DESCRIPTION OF THE PRIOR ART

A traditional ski comprises a lower surface consisting of a sole bordered by longitudinal edges, on which rigid sides, for example made of ABS or phenolic laminate, rest. These sides, which extend over the entire height of the ski are generally perpendicular to the sole thereof. Between the sides, the core is located, which may be produced in various fashions, the core being itself situated between reinforcing elements, the whole being covered by an upper wall which also rests on the upper wall of the sides.

The advantage of such a ski is that the rigidity of the sides ensures excellent transmission of the forces exerted by the skier on the surface of the snow.

It is increasingly frequent, for esthetic reasons, and for reasons of industrialization of the manufacture of these skis, to produce shaped skis, that is to say skis with nonrectangular cross section, having a shell forming the upper face and the lateral faces of the ski, these lateral faces being possibly inclined over at least a part of their height. In such a hypothetical case, the core is most often produced from synthetic foam, for example polyurethane, which has excellent long-term stability properties, whilst being of light weight.

However, this latter type of ski, illustrated especially by documents FR 2,611,518, U.S. Pat. No. 3,272,522 and FR 2,522,976, is not entirely satisfactory because the transmission of the forces on the edges from the upper face of the ski is not produced firmly, considering the absence of sides and of inclination of the lateral walls. This transmission occurs only via shell reinforcing sheets which are pressed flat against the inclined flanks and which bear in point contact on the edges. These skis therefore have average behavior characteristics and cannot satisfy the demands required, especially in competition, where the desired precision in directing the skis requires transmission of the forces from the upper face of the ski to the edges which is as perfect as possible.

In general, the shells constituting modern skis comprise an upper protective element supporting the decoration of the ski, covering a glass fabric frame, optionally containing carbon or aramid fibers, constituting the upper reinforcement of the ski. This reinforcing fabric may, in the upper part corresponding to the upper face of the ski, consist only of unidirectional fibers. However, it is essential for the flaps constituting the lateral faces of the ski to include fibers oriented in the weft direction which are necessary for obtaining sufficient strength, especially in torsion, and providing support on the edges. It is therefore necessary to use fabrics including a warp and a weft, even if this structure is oversized for producing the upper surface of the ski which must mainly provide simple bending strength for the ski.

Furthermore, the linkage between the shell and the lower part of the ski is provided by adhesive bonding. Considering the forces to which the assembly region is subjected, detachment frequently results between the shell and the lower part of the ski including the sole.

SUMMARY OF THE INVENTION

The object of the invention is to provide a ski, in which the transmission of the forces from the upper face of the ski to the edges takes place under the best possible conditions, which has a shell forming its upper face and at least a part of its lateral faces, in order to obtain good esthetic qualities, and which is very solid.

For this purpose, the ski to which it relates, comprising a filling core in one or more parts, for example made of polyurethane foam, a lower face equipped with a running sole and delimited by two longitudinal metal edges, as well as reinforcing and decorative sheets, includes longitudinal reinforcing elements, each bearing on one edge, and forming the sides of the ski, at least one of them extending over a part of the height of this ski, and a shell forming the upper face and a part of at least one of the lateral walls of the ski, and the longitudinal borders of which rest and are fixed on the upper face of the sides, the respective heights of a side and [of] the shell on at least one of the lateral parts of the ski varying in the same proportions over the length of the ski.

The height of the sides is substantially equal to the height of the shell.

This ski has longitudinal reinforcing elements forming sides, which bear on the edges, and which ensure good transmission of the reactions of the skier to the lower face of the ski. Furthermore, the fact that the assembly between the shell and the sides is effected substantially halfway up the ski, that is to say substantially at the same height as the neutral axis of the core of the ski, in which region the compressive and tensile forces are balanced inside the ski, improves the strength characteristics in transverse bending, in lateral bending and in torsion.

Advantageously, under these conditions, the upper reinforcing fabric of the shell consists of unidirectional fibers oriented only in the longitudinal direction of the ski, which constitutes an economizing factor, without impairing the qualities of the ski.

The sides may be perpendicular to the plane of the sole, or inclined with respect to [this perpendicular] *the sole*. In the case that the outer face of each reinforcing element forming a side is inclined, this inclination may be different from or equal to that of the inclined part of the shell. Furthermore, this inclination may be symmetrical or asymmetrical from one side with respect to the other side of one and the same ski.

The reinforcing elements arranged on the two lateral parts of the ski may have characteristics of shape and/or relating to the nature of the materials which are identical or different, and have a constant width over the entire length of the ski, or, on the other hand, have a variable width.

Each reinforcing element may be monobloc or consist of several vertical and juxtaposed layers extending over the length of the ski. These various layers of material may have the same height, or, on the other hand, the various layers may have heights which decrease from the layer situated beside the core of the ski to the one situated furthest outward.

According to another embodiment, the two reinforcing elements located on the two lateral parts of the ski have different heights. An asymmetric ski is then obtained. It is possible to arrange the ski with, especially in the support face, a reinforcing element situated beside the inner edge, which has a height greater than that of the reinforcing element situated beside the outer edge. This arrangement provides a ski having good [quidance] *guidance* qualities on hard snow, as well as good behavioral qualities in powdery snow, because it is possible to thin the ski laterally on the outer edge.

According to another embodiment of this ski, the longitudinal reinforcing elements belong to a single piece which occupies the entire width of the ski. This piece may be of rectangular cross section, of general H-shaped cross section, or alternatively of general U-shaped cross section. In this case, the part of the piece situated at the center of the ski constitutes a part of the core of the ski.

According to one embodiment of this ski, the shell includes at its two longitudinal borders, two returns which are parallel to the plane of the sole of the ski, bearing on the two reinforcing elements.

According to another embodiment, the shell includes, at its two longitudinal borders, two returns which are inclined with respect to the plane of the sole of the ski, bearing on the upper inclined faces of each of the reinforcing elements.

Advantageously, these two returns constituting the borders of the shell have constant width over the entire length of the ski.

The two returns of the shell may be situated at the lateral faces of the ski or set back with respect to these lateral faces.

According to one possibility, each reinforcing element has a width greater than that of the corresponding return of the shell, and rises partly along the inner inclined part of the shell.

According to another embodiment of this ski, the borders of the shell are embedded in the longitudinal reinforcing elements.

According to one embodiment, this ski contains a metal or glass, carbon or aramid laminate reinforcing plate which, extending over all or part of the length of the ski, occupies the entire width thereof.

This metal plate reinforces the ski in lateral bending. It may be present over the entire length of the ski or only over part of this length, and preferably in the support face. This plate may be made of a light alloy, such as an aluminum alloy known under the brand name ZICRAL. This plate may be solid or openworked.

According to one embodiment, the reinforcing plate is inserted between the upper face of the longitudinal reinforcing elements and the base of the shell.

According to another embodiment, the longitudinal borders of the reinforcing plate are embedded in the longitudinal reinforcing elements. In this case, the metal plate is embedded in the longitudinal reinforcing elements with injection of polyurethane foam constituting the core, the plate being perfectly positioned and held in the desired position by virtue of the embedding of its borders in grooves provided in the longitudinal reinforcing elements.

According to another embodiment, the reinforcing plate is profiled by several longitudinal folds and is separated from the shell.

BRIEF DESCRIPTION OF THE DRAWINGS

In any case, the invention will be better understood with the aid of the following description, with reference to the attached schematic drawing representing, by way of non-limiting examples, several embodiments of this ski.

DESCRIPTION OF THE PREFERRED EMBODIMENTS

Figure 1:
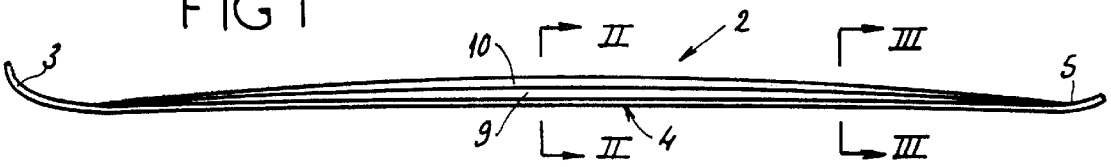
FIG. 1 is a side view of a ski according to the invention.

The ski 2 represented in FIG. 1 comprises a tip 3, a support face 4 and a heel 5. This ski essentially consists of a filling core 6, for example made of polyurethane foam, resting on the lower part of the ski, which comprises a sole 7 bounded by two longitudinal metal edges 8. A reinforcing element 9 forming a side of the ski rests on each edge 8. In the embodiment represented in FIGS. 2 and 3, the sides 9 are perpendicular to the plane of the sole 7. The upper face of the ski, as well as the upper parts of the lateral walls, [consist of] *include* a shell 10. This shell 10 includes two shoulders 12, substantially parallel to the plane of the sole, bearing against the two upper faces, of the same orientation, which the sides 9 include. With this shell 10 is associated a reinforcing sheet 15, located under the shell and in contact with the latter, [consisting for example of] *including, for example,* a fabric with longitudinally oriented unidirectional fibers impregnated with resin. A lower reinforcing sheet 16 is located above the sole 7.

According to the essential feature of the invention, the respective heights (H1, H2) of the sides 9 and of the shell 10 are substantially equal, so that the region of bearing and assembly of the borders 12 of the shell 10 and the sides 9 is situated substantially at the same height as the neutral axis of the core of the ski.

This is therefore a ski including sides 9 ensuring very good transmission of the forces from the upper face of the ski which is equipped with the binding of a boot, to the edges 8. Furthermore, the region of assembly between the shell and the sides is situated substantially at the level of the neutral axis.

The skis represented in the following figures are simplified representations, in which some elements, such as the reinforcing sheets 15, 16, are not shown.

Figure 2:
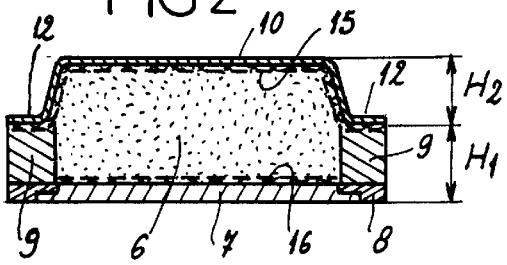
FIGS. 2 and 3 are two views thereof, in cross section and on a larger scale, along the lines II—II and III—III in FIG. 1.
Figure 3:
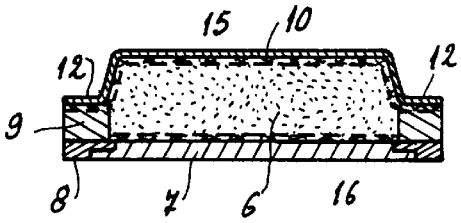
Figure 4:
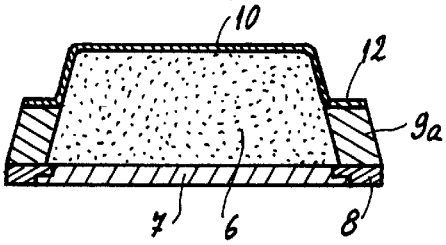
FIGS. 4 and 5 are two views respectively similar to FIGS. 2 and 3, of an alternative embodiment of this ski.
Figure 6:
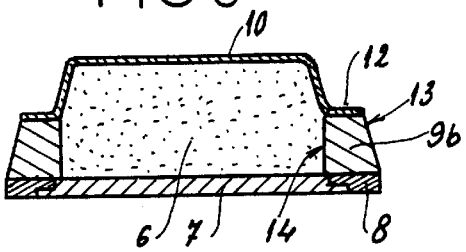
FIG. 6 is a cross-sectional view, similar to FIG. 4, representing an alternative embodiment of this ski.

FIGS. 4 and 6, which correspond to FIGS. 2 and 3 respectively, represent a ski including sides 9a which are inclined with respect to [the] *a plane* perpendicular to [the] *a* plane of the sole 7.

In the embodiment represented in FIG. 6, each longitudinal reinforcing element 9b has an inclined outer face 13 and an inner face 14 which is perpendicular to the plane of the sole.

Figure 7:
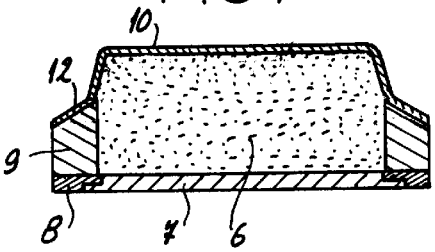
FIG. 7 is a cross-sectional view, similar to FIG. 2, representing an alternative embodiment of this ski.

The ski represented in FIG. 7 is a variant of the ski in FIGS. 1 to 3, in which each shoulder 12 of the shell 10 bears on the upper face of a side 9, which is inclined downward and outward.

Figure 8:
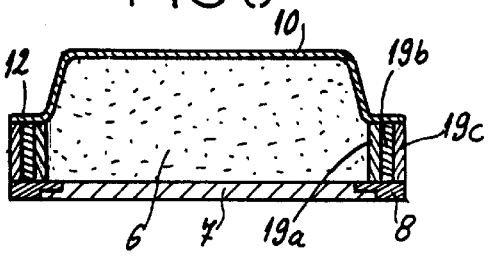
FIGS. 8 to 10 are three cross-sectional views of a ski in which each lateral reinforcing element is made from several layers.
Figure 9:
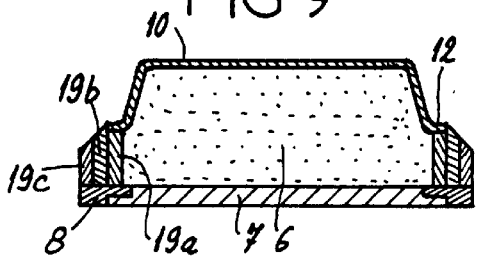
Figure 10:
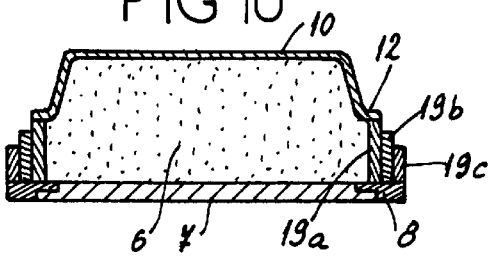

FIGS. 8 to 10 represent three skis, in which each reinforcing element [consists of] *includes* three vertically juxtaposed layers of material 19a, 19b, 19c. In the embodiment represented in FIG. 8, the three layers have the same height and the return 12 associated with each lateral part of the ski extends over the entire width of the three layers, which [consist of] *includes* different materials, such as wood, phenolic resin aluminum alloy, acryloni- trile-butadiene-styrene, [. .] *etc*. In the embodiment represented in FIGS. 9 and 10, the heights of the layers 19a, 19b and 19c decrease from the one 19a situated beside the core of the ski to the one *layer* 19c situated on the outside. In FIG. 9, each return 12 of the shell bears only on the layer 19a, and the upper faces of the layers 19c and 19b are cut slantwise so as to form an inclined surface. In the embodiment represented in FIG. 10, each return 12 bears only on the upper face of the layer 19a, and the upper faces of the layers 19b and 19c are parallel to the upper plane of the shell, which results in a general staircase structure.

Figure 11:
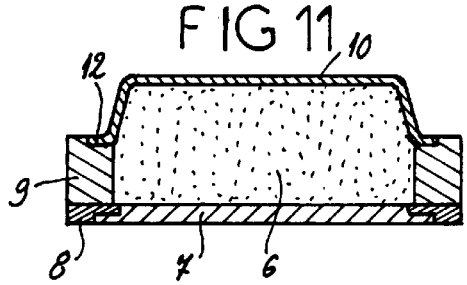
FIG. 11 is a cross-sectional view of a ski in which each base of the shell extends only over a part of the width of the corresponding reinforcing element.

FIG. 11 represents a ski in which each return 12 of the shell 10 bears on only a part of the width of a reinforcing element 9 and is embedded therein.

Figure 12:
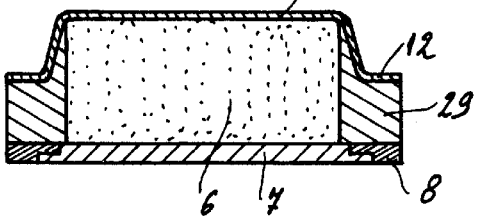
FIG. 12 is a cross-sectional view of a ski in which the width of each reinforcing element is greater than the width of each return of the shell.

In the embodiment represented in FIG. 12, the width of each reinforcing element 29 is greater than the width of the corresponding return 12 of the shell, and the reinforcing element rises partly under the shell, so that it cannot be seen over its entire height from the outside of the ski.

Figure 13:
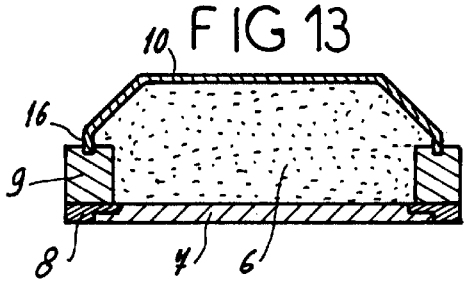
FIG. 13 is a cross-sectional view of a ski in which the borders of the shell are embedded in the longitudinal reinforcing elements.

In the embodiment represented in FIG. 13, the shell 10 does not include lateral returns, but simply borders 16 of substantially vertical orientation which are embedded in the longitudinal reinforcing elements 9.

Figure 14:
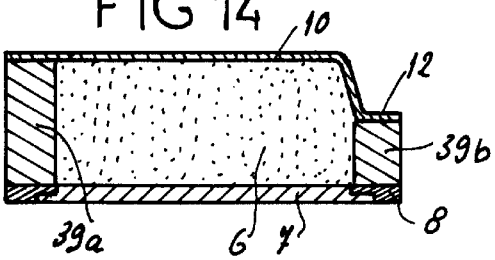
FIG. 14 is a cross-sectional view of a ski in which the heights of the two longitudinal reinforcing elements are different.

FIG. 14 represents an asymmetrical ski, including a reinforcing element 39a situated beside the inner edge, with a height greater than that of the reinforcing element 39b situated beside the outer edge. In this case, the shell comprises a planar part corresponding to the upper face of the ski, bearing directly on the reinforcing element 39a, an inclined part, and a return 12 bearing on the upper face of the reinforcing element 39b.

Figure 15:
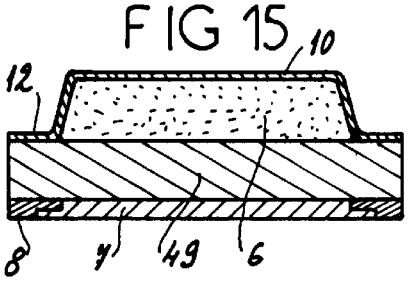
FIGS. 15 to 17 are three cross-sectional views of a ski, in which views the longitudinal reinforcing elements belong to one and the same piece.

The ski represented in FIG. 15 comprises a piece 49 of rectangular cross section, made from a hard material, for example from wood, extending over the entire width of the ski, and forming the longitudinal reinforcing elements.

Figure 16:
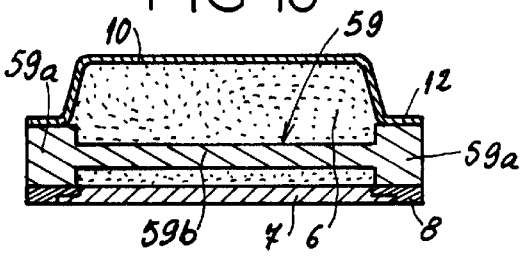

FIG. 16 represents a ski including a piece 59 of H-shaped cross section, whose two arms 59a form the longitudinal reinforcing elements and whose central part 59b forms a part of the core of the ski.

Figure 17:
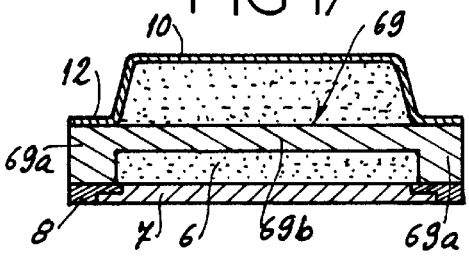
Figure 18:
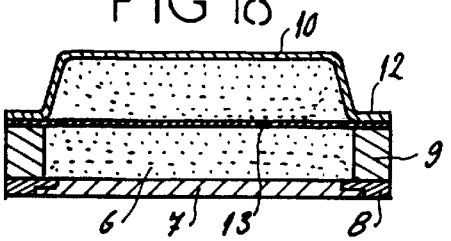
FIGS. 18 to 21 are four cross-sectional views of a ski including reinforcing plates[.]*; and*

FIG. 17 represents another ski including a piece 69 made of hard material, for example of wood, of general U-shape, whose two arms 69a form the longitudinal reinforcing elements, and whose crossbar 69b belongs to the core of the ski.

FIGS. 18 to 21 represent skis in which the same elements are denoted by the same references as before. In each of these skis, a metal or laminate reinforcing plate is provided, which reinforces the ski in lateral bending. In the embodiment represented in FIG. 18, the plate 13 is inserted between the upper face of the reinforcing elements 9 and the base of the shell.

Figure 19:
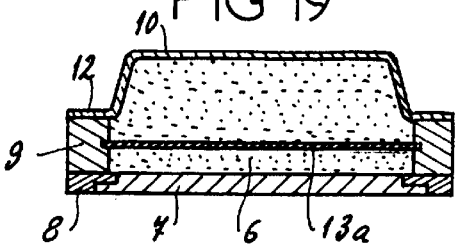

In the embodiment represented in FIG. 19, the plate 13a is embedded by its longitudinal borders in the opposite walls of the two reinforcing elements 9, which makes it possible to ensure perfect positioning of the plate before injection of the synthetic foam intended to form the core.

Figure 20:
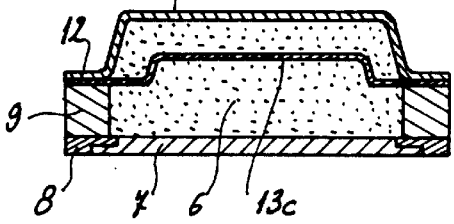
Figure 21:
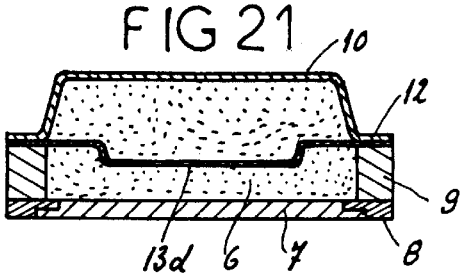
Figure 22:
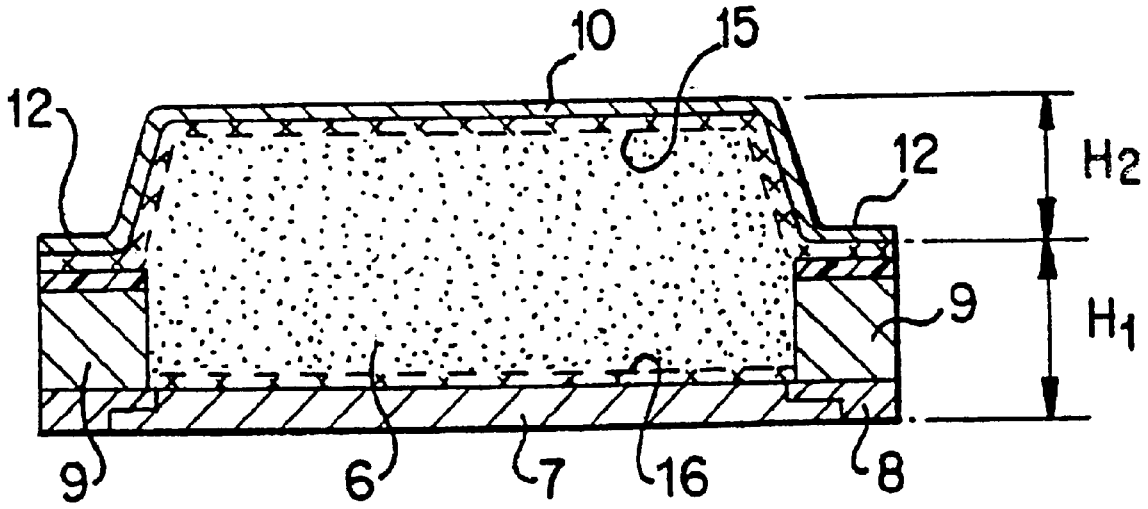
FIG. 22 is a cross-sectional view of a ski embodying the invention.

In the embodiments represented in FIGS. 20 and 21, the reinforcing plate 13c and 13d respectively, is profiled by longitudinal folds, and inserted between the upper face of the reinforcing elements 9 and the returns 12 of the shell. In the embodiment represented in FIG. 20, the plate 13c is profiled in the same direction as the shell, while in the embodiment represented in FIG. 21, the plate 13d is profiled in the opposite direction to the shell.

It is advantageously possible to insert an elastic joint between the base of the shell and the reinforcing elements.

The angle which the lateral walls of the shell form with its upper wall may vary over the length of the ski, this angle being, for example, larger in the support face than in the end regions, tip and heel, of the ski.

The ridge defining the upper wall of the shell, and each inclined wall thereof, may be parallel to the longitudinal mid-axis of the ski or, on the other hand, have an orientation which varies with respect to this axis, it being possible for the line which this ridge forms, straight or curved, to, for example, diverge from the rear toward the front of the ski.

As is obvious, the invention is not limited only to the embodiments of this ski which have been described hereinabove by way of examples. Thus, certain features described in the scope of one combination might be employed in the scope of another combination, or alternatively, the shape of the shell might be different, and for example have a section in the form of a segment of an ellipse in the end regions of the ski, without thereby departing from the scope of the invention.

I claim:

1. A ski extending in a longitudinal direction, comprising a main body portion and upwardly curved front and rear end portions, the main body portion comprising:

a lower face including a central sliding sole delimited by two lower edges, the lower edges being located on opposite sides of the sliding sole;

two reinforcing elements extending in the longitudinal direction of the ski, each reinforcing element being supported on one of the lower edges and forming a side of the ski, wherein the reinforcing elements extend over a part of a height of the ski;

a shell having a central top portion and two peripheral edge portions, the central top portion and the two peripheral edge portions extending in the longitudinal direction of the ski, wherein the peripheral edge portions are supported by the reinforcing elements, wherein in at least one zone of the ski which includes at least a central longitudinal portion of the main body, the central longitudinal portion of the shell is spaced above the peripheral edge portion to define a height of the shell, and the central portion is connected to the peripheral edge portions by inclined lateral side portions, and wherein in the at least one zone of the ski, the height of the shell decreases from said central longitudinal portion toward said [and] *end* portions and varies directly proportionately over the length of the at least one zone with a height of at least one reinforcing element; and a core located between inner lateral sides of the reinforcing elements.

2. The ski as claimed in claim 1, wherein a of at least one reinforcing element is substantially equal to a height of the shell.

3. The ski as claimed in claim 1, wherein an outer face of each reinforcing element is substantially perpendicular to the plane of the sole.

4. The ski as claimed in claim 1, wherein an outer face of at least one reinforcing element is inclined with respect to a plane that is perpendicular to the plane of the sole.

5. The ski as claimed in claim 4, wherein the at least one lateral side portion is inclined with respect to a plane that is perpendicular to the plane of the sole, and wherein an angle of inclination of the at least one lateral side portion is substantially equal to an angle of inclination of the outer face of the at least one reinforcing element.

6. The ski as claimed in claim 4, wherein the at least one lateral side portion is inclined with respect to a plane that is perpendicular to the plane of the sole, and wherein an angle of inclination of the at least one lateral side portion is different from an angle of inclination of the outer face of the at least one reinforcing element.

7. The ski as claimed in claim 1, wherein the two reinforcing elements comprise separate elements.

8. The ski as claimed in claim 7, wherein the two reinforcing elements have a constant width over the length of the ski [that they] *over which the two reinforcing elements* extend.

9. The ski as claimed in claim 7, wherein the two reinforcing elements have a width which is variable over the length of the ski [that they] *over which the two reinforcing elements* extend.

10. The ski as claimed in claim 7, wherein the two reinforcing elements are substantially identical.

11. The ski as claimed in claim 7, wherein the two reinforcing elements have different [shade] *shape* characteristics.

12. The ski as claimed in claim 7, wherein each reinforcing element comprises several vertical and juxtaposed layers of material extending over a length of the ski.

13. The ski as claimed in claim 12, wherein the layers comprising each reinforcing element have [the same height] *heights that are equal.*

14. The ski as claimed in claim 12, wherein a height of the layers comprising each reinforcing element decreases from the layer situated beside the core of the ski to the layer situated furthest outward.

15. The ski as claimed in claim 7, wherein the two reinforcing elements have different heights.

16. The ski as claimed in claim 7, wherein the two reinforcing elements comprise different materials having different properties.

17. The ski as claimed in claim 1, wherein the two reinforcing elements comprise a single piece of material that extends across the entire width of the ski.

18. The ski as claimed in claim 17, wherein the single piece of material has a rectangular cross section.

19. The ski as claimed in claim 17, wherein the single piece of material has an H-shaped cross section.

20. The ski as claimed in claim 17, wherein the single piece of material has an U-shaped cross section.

21. The ski as claimed in claim 1, wherein the peripheral edge portions of the shell are embedded in the reinforcing elements.

22. The ski as claimed in claim 1, further comprising a metal or laminate reinforcing plate that extends over at least a portion of the length of the ski, and that extends over the entire width thereof.

23. The ski as claimed in claim 22, wherein the reinforcing plate comprises a light metal alloy[, such as an aluminum alloy known under the brand name ZIRCAL].

24. The ski as claimed in claim 22, wherein the plate has a plurality of apertures therein.

25. The ski as claimed in claim 22, wherein the reinforcing plate is inserted between upper faces of the reinforcing elements and the peripheral edge portions of the shell.

26. The ski as claimed in claim 25, wherein the reinforcing plate comprises a longitudinally extending central portion and two longitudinally extending side portions that are joined to the central portion by longitudinally extending folds, and wherein the central portion has a height that is different from a height of the two side portions.

27. The ski as claimed in claim 22, wherein longitudinally extending edges of the reinforcing plate are embedded in the reinforcing elements.

28. The ski as claimed in claim 1, further comprising at least one elastic joint that is inserted between the peripheral edge portions of the shell and upper surfaces of the reinforcing elements.

29. The ski as claimed in claim 1, further comprising reinforcing fabric that is located in contact with an inner face of the shell, the reinforcing fabric comprising a plurality of unidirectional fibers oriented in the longitudinal direction of the ski.

30. The ski as claimed in claim 1, wherein the peripheral edges extend parallel to the plane of the sole and bear on upper surfaces of corresponding reinforcing elements.

31. The ski as claimed in claim 30, wherein the peripheral edge [portion] *portions* have a substantially constant width over the length of the ski [that they] *over which the peripheral edge portions* extend.

32. The ski as claimed in claim 30, wherein the peripheral edge portions substantially cover upper surfaces of the corresponding reinforcing elements.

33. The ski as claimed in claim 30, wherein the peripheral edges extend only partially across the upper surfaces of corresponding reinforcing elements.

34. The ski as claimed in claim 33, wherein a portion of the upper surface of at least one reinforcing element is inclined with respect to a plane that is perpendicular to the plane of the sole, and wherein the inclined portion of the at least one reinforcing element supports at least one lateral side portion of the shell.

35. The ski as claimed in claim 1, wherein in at least one zone of the ski the peripheral edges extend outward and downward and bear on inclined upper surfaces of corresponding reinforcing elements.

* * * * *

UNITED STATES PATENT AND TRADEMARK OFFICE

CERTIFICATE OF CORRECTION

PATENT NO. : Re. 36,453
DATED : December 21, 1999
INVENTOR(S) : Roger Abondance, Jean Bauvois, Jean-Marc Forneri

Figure 5:
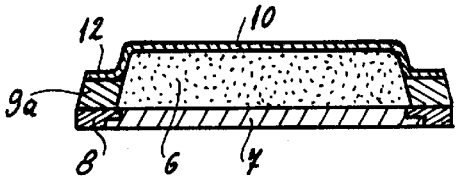

It is certified that error appears in the above-identified patent and that said Letters Patent is hereby corrected as shown below:

Column 5, line 4, change "FIGS. 4 and 6" to --FIGS. 4 and 5--.

Column 5, line 26, change "one 19a" to --one layer 19a--.

Column 6, line 42, change "I claim." to --We claim.--

Claim 2, line 1 (column 7, line 7), change "wherein a of" to --wherein a height of--.

Signed and Sealed this

Second Day of January, 2001

*Attest:*

*Attesting Officer*

Q. TODD DICKINSON

*Commissioner of Patents and Trademarks*